(12) United States Patent
Alahyari et al.

(10) Patent No.: US 12,735,185 B2
(45) Date of Patent: Sep. 15, 2026

(54) GALLEY COOLER WITH LATENT HEAT RECOVERY

(71) Applicant: B/E Aerospace, Inc., Winston Salem, NC (US)

(72) Inventors: Abbas A. Alahyari, Glastonbury, CT (US); Yasmin Khakpour, South Windsor, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 192 days.

(21) Appl. No.: 18/658,867

(22) Filed: May 8, 2024

(65) Prior Publication Data

US 2025/0346356 A1 Nov. 13, 2025

(51) Int. Cl.

*B64D 13/08* (2006.01)
*B64D 11/04* (2006.01)
*B64D 13/06* (2006.01)

(52) U.S. Cl.

CPC .............. *B64D 13/08* (2013.01); *B64D 11/04* (2013.01); *B64D 2013/0629* (2013.01)

(58) Field of Classification Search

CPC .................... B64D 13/08; B64D 11/04; B64D 2013/0629; B64D 2013/0674; B64D 13/06; F24F 13/22; F24F 2013/225

See application file for complete search history.

(56) References Cited

U.S. PATENT DOCUMENTS 3,938,352 A * 2/1976 Schmidt ................ F25B 29/003 62/428
4,938,035 A * 7/1990 Dinh ....................... F24F 1/022 62/506
8,516,832 B2 * 8/2013 Bhavsar .................. F25B 21/02 62/3.6
11,136,125 B2 10/2021 Tsai et al.
11,306,958 B2 4/2022 Moran
11,502,021 B2 * 11/2022 Burd ..................... H01L 23/467
11,828,497 B2 11/2023 Burd
2004/0055324 A1 * 3/2004 Gupta ....................... F24F 1/18 62/305
2005/0061012 A1 * 3/2005 Zywiak ................... F25B 41/22 62/244
2010/0058778 A1 * 3/2010 Bhatti ................... F24F 3/1423 62/3.7
2013/0061615 A1 * 3/2013 Omer .................... F24F 13/222 62/277
2022/0332427 A1 * 10/2022 Will ........................ F25B 21/04

* cited by examiner

*Primary Examiner* — Lionel Nouketcha
(74) *Attorney, Agent, or Firm* — SNELL & WILMER L.L.P.

(57) ABSTRACT

A galley cooler is disclosed herein. The galley cooler includes a cooling system and a delivery system. The cooling system includes a hot side and a cold side. The hot side includes a hot side inlet. The cold side is configured to, in response to cooling ambient air entering the cooling system on the hot side via the hot-side inlet, condense moist air into liquid water on the cold side. The delivery system delivers the condensed liquid water to the hot side of the cooling system to pre-cool the ambient air via evaporative cooling.

10 Claims, 7 Drawing Sheets

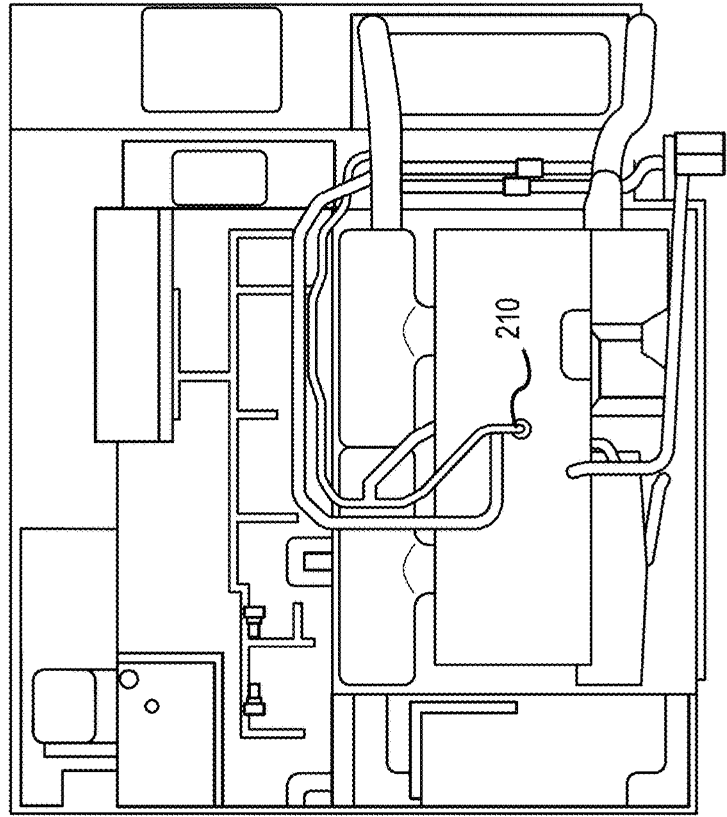
FIG. 2B

GALLEY COOLER WITH LATENT HEAT RECOVERY

FIELD

The present disclosure generally relates to systems for galley cooling in an aircraft, and more specifically, to a galley cooler with latent heat recovery.

BACKGROUND

Thermoelectric coolers combined with the Micro Air-Cooled Exchangers (MACE) heat exchanger technology on the hot and cold sides have typically been used for galley and beverage coolers. In these thermoelectric coolers, moist air condenses on the cold-side heat exchanger and results in liquid water that needs to be somehow discarded.

SUMMARY

An aircraft galley is disclosed herein. The aircraft galley includes a cooling system and a delivery system. The cooling system includes a hot side and a cold side. The hot side comprises a hot-side inlet. The cold side is configured to, in response to cooling ambient air entering the cooling system on the hot side via the hot-side inlet, condense moist air into liquid water on the cold side. The delivery system delivers the condensed liquid water to the hot side of the cooling system to pre-cool the ambient air via evaporative cooling.

In various embodiments, the galley cooler further includes an inlet duct. In various embodiments, the inlet duct is coupled to the hot-side inlet. In various embodiments, the inlet duct comprises an outer lining. In various embodiments, the condensed liquid water soaks the outer lining. In various embodiments, the ambient air passing through the inlet duct is pre-cooled by evaporating the condensed liquid water from the outer lining.

In various embodiments, the outer lining is comprised of an absorbent material.

In various embodiments, the outer lining is coated with a hydrophilic coating to enhance evaporation rates.

In various embodiments, the galley cooler further includes an inlet duct and a porous inlet heat exchanger element. In various embodiments, the inlet duct is coupled to the hot-side inlet. In various embodiments, the porous inlet heat exchanger element is integrated in-line with the inlet duct coupled to the hot-side inlet. In various embodiments, the ambient air passing through the porous inlet heat exchanger element is pre-cooled by evaporating the condensed liquid water from the porous inlet heat exchanger element.

In various embodiments, the porous inlet heat exchanger element is coated with a hydrophilic coating to enhance evaporation rates.

In various embodiments, the delivery system delivers the condensed liquid water directly to an inlet fan of the hot-side inlet thereby pre-cooling the ambient air.

In various embodiments, the condensed liquid water is at least one of sprayed or dripped into the inlet fan.

Also disclosed here in an aircraft. The aircraft includes a galley, a cooling system configured within the galley, and a delivery system. The cooling system includes a hot side and a cold side. The hot side comprises a hot-side inlet. The cold side is configured to, in response to cooling ambient air entering the cooling system on the hot side via the hot-side inlet, condense moist air into liquid water on the cold side. The delivery system delivers the condensed liquid water to the hot side of the cooling system to pre-cool the ambient air via evaporative cooling.

In various embodiments, the aircraft further includes an inlet duct. In various embodiments, the inlet duct is coupled to the hot-side inlet. In various embodiments, the inlet duct comprises an outer lining. In various embodiments, the condensed liquid water soaks the outer lining. In various embodiments, the ambient air passing through the inlet duct is pre-cooled by evaporating the condensed liquid water from the outer lining.

In various embodiments, the outer lining is comprised of an absorbent material.

In various embodiments, the outer lining is coated with a hydrophilic coating to enhance evaporation rates.

In various embodiments, the aircraft further includes an inlet duct and a porous inlet heat exchanger element. In various embodiments, the inlet duct is coupled to the hot-side inlet. In various embodiments, the porous inlet heat exchanger element is integrated in-line with the inlet duct coupled to the hot-side inlet. In various embodiments, the ambient air passing through the porous inlet heat exchanger element is pre-cooled by evaporating the condensed liquid water from the porous inlet heat exchanger element.

In various embodiments, the porous inlet heat exchanger element is coated with a hydrophilic coating to enhance evaporation rates.

In various embodiments, the delivery system delivers the condensed liquid water directly to an inlet fan of the hot-side inlet thereby pre-cooling the ambient air.

In various embodiments, the condensed liquid water is either sprayed or dripped into the inlet fan.

Also disclosed here in a system. The system includes a cooling system and a delivery system. The cooling system includes a hot side and a cold side. The hot side comprises a hot-side inlet. The cold side is configured to, in response to cooling ambient air entering the cooling system on the hot side via the hot-side inlet, condense moist air into liquid water on the cold side. The delivery system delivers the condensed liquid water to the hot side of the cooling system to pre-cool the ambient air via evaporative cooling.

In various embodiments, the system includes an inlet duct. In various embodiments, the inlet duct is coupled to the hot-side inlet. In various embodiments, the inlet duct comprises an outer lining. In various embodiments, the condensed liquid water soaks the outer lining. In various embodiments, the ambient air passing through the inlet duct is pre-cooled by evaporating the condensed liquid water from the outer lining. In various embodiments, the outer lining is comprised of an absorbent material. In various embodiments, the outer lining is coated with a hydrophilic coating to enhance evaporation rates.

In various embodiments, the system further includes an inlet duct and a porous inlet heat exchanger element. In various embodiments, the inlet duct is coupled to the hot-side inlet. In various embodiments, the porous inlet heat exchanger element is integrated in-line with the inlet duct coupled to the hot-side inlet. In various embodiments, the ambient air passing through the porous inlet heat exchanger element is pre-cooled by evaporating the condensed liquid water from the porous inlet heat exchanger element. In various embodiments, the porous inlet heat exchanger element is coated with a hydrophilic coating to enhance evaporation rates.

In various embodiments, the delivery system delivers the condensed liquid water directly to an inlet fan of the hot-side inlet thereby pre-cooling the ambient air. In various embodiments, the condensed liquid water is either sprayed or dripped into the inlet fan.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 2A and 2B illustrate a galley in an aircraft, in accordance with various embodiments.

DETAILED DESCRIPTION

Figure 1:
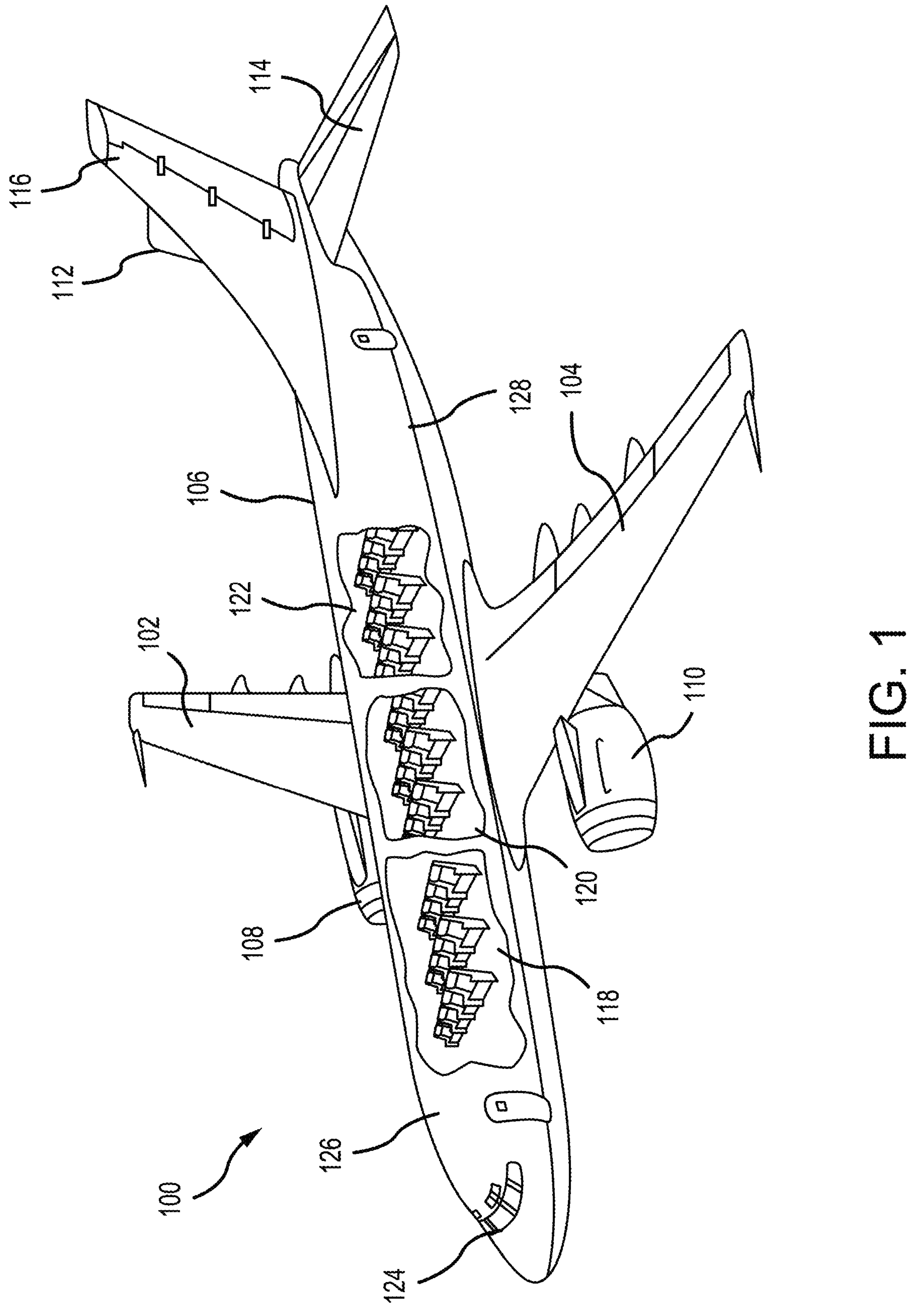
FIG. 1 illustrates an aircraft and various sections within the aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Thermoelectric coolers combined with the air-cooled heat exchangers have been used for galley and beverage coolers. In these coolers, cooling ambient air on a hot side of the cooling system results in moist air condensing on a cold-side of the cooling system, which results in condensed liquid water that needs to be discarded.

Disclosed herein is a galley cooling system where the condensed liquid water from a cold-side of a cooling system is delivered to a hot side of the cooling system in order to take advantage of the evaporative cooling resulting in higher cooling capacity and coefficient of performance (COP). In various embodiments, the condensed liquid water is delivered to an outer lining of a duct coupled to a hot-side inlet of the cooling system. In various embodiments, the outer lining may be a wicking or absorbent material, among others. In various embodiments, the absorbent material may be material, such as wool, polyester, or cotton, among others, or a textile, i.e., a product made of fibers, such as wool, polyester, or cotton, among others, arranged as, for example, felt. In various embodiments, the ambient air passing through the duct is cooled via adiabatic transfer from the outside lining thereby evaporating the condensed liquid water delivered to outside lining. In various embodiments, the condensed liquid water may be delivered to the wicking or absorbent material, among others, of the inlet duct, via a delivery system, such as gravity or a pump, among other means, so as to soak the outer lining of the duct. In various embodiments, a porous inlet heat exchanger element may be inserted in-line with the hot-side inlet and/or the duct. In various embodiments, the porous heat exchanger acts as a precooler to evaporate the condensed liquid water and cool the ambient air being fed into the hot-side inlet. In that regard, the condensed liquid water may be delivered to the porous heat exchanger and the ambient air passing through the duct also passes through the porous heat exchanger evaporating the condensed liquid water delivered to porous heat exchanger. In various embodiments, the condensed liquid water may be delivered to the porous heat exchanger via a delivery system, such as gravity or a pump, among other means. In various embodiments, a pump may be used to directly inject the condensed liquid water into an inlet fan the hot-side inlet.

Referring now to FIG. 1, an aircraft 100 and various sections within the aircraft is illustrated, in accordance with various embodiments. Aircraft 100 is an example of a passenger or transport vehicle in which a cooling system may be implemented in accordance with various embodiments. In various embodiments, aircraft 100 has a starboard wing 102 and a port wing 104 attached to a fuselage 106. In various embodiments, aircraft 100 also includes a starboard engine 108 connected to starboard wing 102 and a port engine 110 connected to port wing 104. In various embodiments, aircraft 100 also includes a starboard horizontal stabilizer 112, a port horizontal stabilizer 114, and a vertical stabilizer 116. In various embodiments, aircraft 100 also includes various cabin sections, including, for example, a first cabin section 118, a second cabin section 120, a third cabin section 122, and a pilot cabin 124. In various embodiments, aircraft 100 may include a front galley 126 and/or a rear galley 128.

Figure 2A:
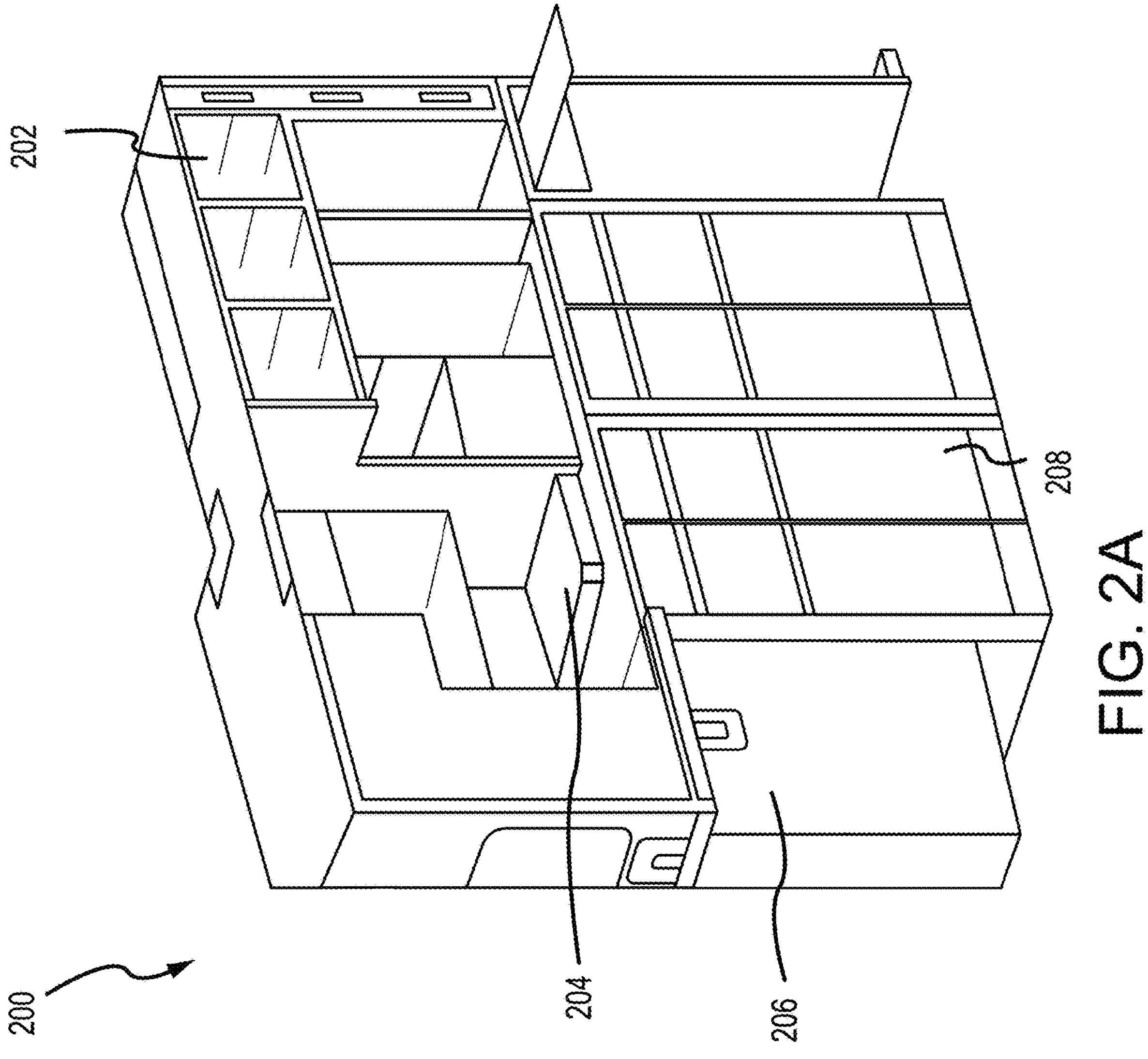

Referring now to FIGS. 2A and 2B, a galley 200 is illustrated, in accordance with various embodiments. In various embodiments, the galley 200 may be an example of the front galley 126 or the rear galley 128 of FIG. 1. FIG. 2A illustrates a front view of the galley 200. FIG. 2B illustrates a rear view of the galley 200. In various embodiments, the galley 200 may include a plurality of stowage bins 202, a preparation area 204, a trash receptacle 206, and one or more galley carts, stowage areas, or cooled compartments 208. In various embodiments, air to cooled compartments 208 may be supposed via hot-side air inlet 210 on the rear of the cooled compartments 208.

Figure 3:
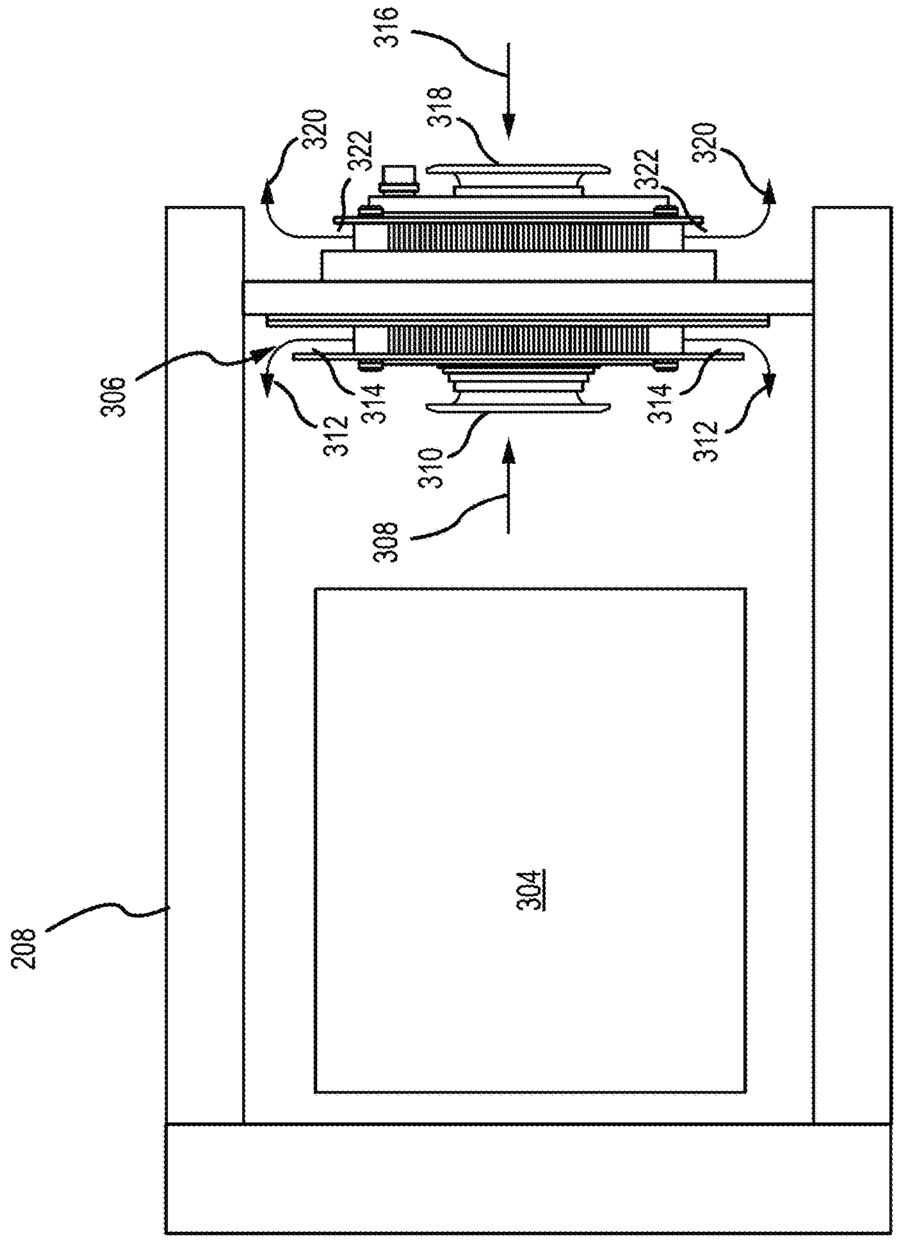
FIG. 3 illustrates a cooled compartment, in accordance with various embodiments.

Referring now to FIG. 3, a cooled compartment 302, such as one of cooled compartments 208 of FIGS. 2A and 2B, is illustrated, in accordance with various embodiments. In various embodiments, the cooled compartment 302 may include a space or volume 304 to cool a components, such as a galley cart or a shelved cabinet, among others. In various embodiments, in order to cool the cooled compartment 302, a cooling system 306 is integrated into one of the walls enclosing the space or volume 304. In various embodiments, the cooling system 306 is typically integrated into a rear wall of the cooled compartment 302. In various embodiments, chilled air 308 from the space or volume 304 flows into a cold-side inlet 310 of the cooling system 306 and cold air 312 flows out of cold-air outlets 314 of the cooling system 306. In various embodiments, ambient air 316 from the cabin area of the aircraft flows into a hot-side inlet 318 of the cooling system 306 and ambient air 320 flows out of hot-air outlets 322 of the cooling system 306. In various embodiments, the cooling system 306 includes a plurality of cooling fins and plates that rotate to cool the ambient air 316 flowing in from the hot-side inlet 318 while also cooling the chilled air 308 flowing in from the cold-side inlet 310. In various embodiment, the cooling system 306 transfers heat from a cold side, i.e. a cold-side heat exchanger, to a hot side, i.e. a hot-side heat exchanger, where the heat is rejected from the hot-side heat exchanger to the ambient air. This heat pumping effect may be accomplished through several means, e.g., thermoelectric or vapor-compression refrigeration, among others. A plurality of fans on either side induce airflow through cold-side and hot-side heat exchangers. On the cold side, chilled air from chilled space is forced through the cold-side heat exchanger to be further chilled. On hot-side, ambient air is forced through the hot-side heat exchanger to remove heat. In various embodiments, pre-cooling the ambient air entering the hot-side heat exchanger by means of evaporative cooling improves system efficiency.

Figure 4:
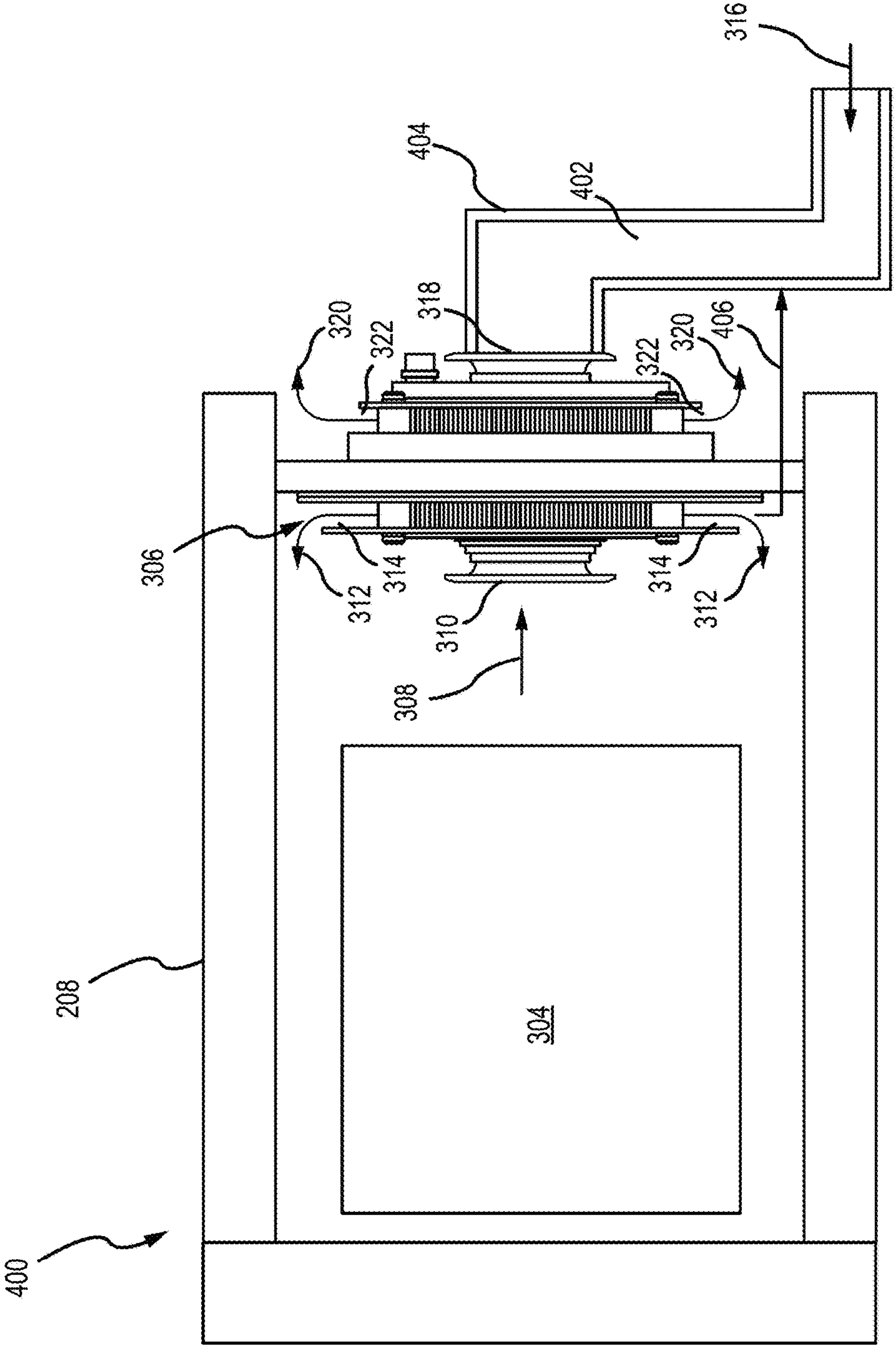
FIG. 4 illustrates a condensed liquid water galley cooling system, in accordance with various embodiments.

Referring now to FIG. 4, a condensed liquid water galley cooling system 400 is illustrated, in accordance with various embodiments. The cooled compartment 302 of the condensed liquid water galley cooling system 400 is similar to that of the cooled compartment illustrated in FIG. 3 in that the cooled compartment 302 may include a space or volume 304 to cool a components, such as a galley cart or a shelved cabinet, among others. In various embodiments, in order to cool the cooled compartment 302, the cooling system 306 is integrated into one of the walls enclosing the space or volume 304. In various embodiments, the cooling system 306 is typically integrated into a rear wall of the cooled compartment 302. In various embodiments, the chilled air 308 from the space or volume 304 flows into the cold-side inlet 310 of the cooling system 306 and the cold air 312 flows out the cold-air outlets 314 of the cooling system 306. In various embodiments, the ambient air 316 from the cabin area of the aircraft flows into the hot-side inlet 318 of the cooling system 306 and the ambient air 320 flows out of the hot-air outlets 322 of the cooling system 306.

In addition, the condensed liquid water galley cooling system 400 includes an inlet duct 402 that feeds the ambient air 316 to the hot-side inlet 318. In various embodiments, the inlet duct 402 includes an outer lining 404. In various embodiments, the outer lining 404 may be a wicking or absorbent material, among others. In various embodiments, the absorbent material may be felt, wool, among others. In various embodiments, moist air condenses on the cold-side of the cooling system 306, which results in condensed liquid water 406 that needs to be discarded. In various embodiments, the condensed liquid water 406 is delivered to the outer lining 404. In various embodiments, the ambient air 316 passing through the inlet duct 402 is cooled via adiabatic transfer from the outer lining 404 thereby evaporating the condensed liquid water 406 from the outer lining 404. In various embodiments, the outer lining 404 may be coated with a hydrophilic coating to enhance evaporation rates. In various embodiments, the condensed liquid water may be delivered to the outer lining 404 via a delivery system, such as gravity or a pump, among other means, so as to soak the outer lining 404 of the inlet duct 402 and take advantage of the evaporative cooling resulting in higher cooling capacity and coefficient of performance (COP).

Figure 5:
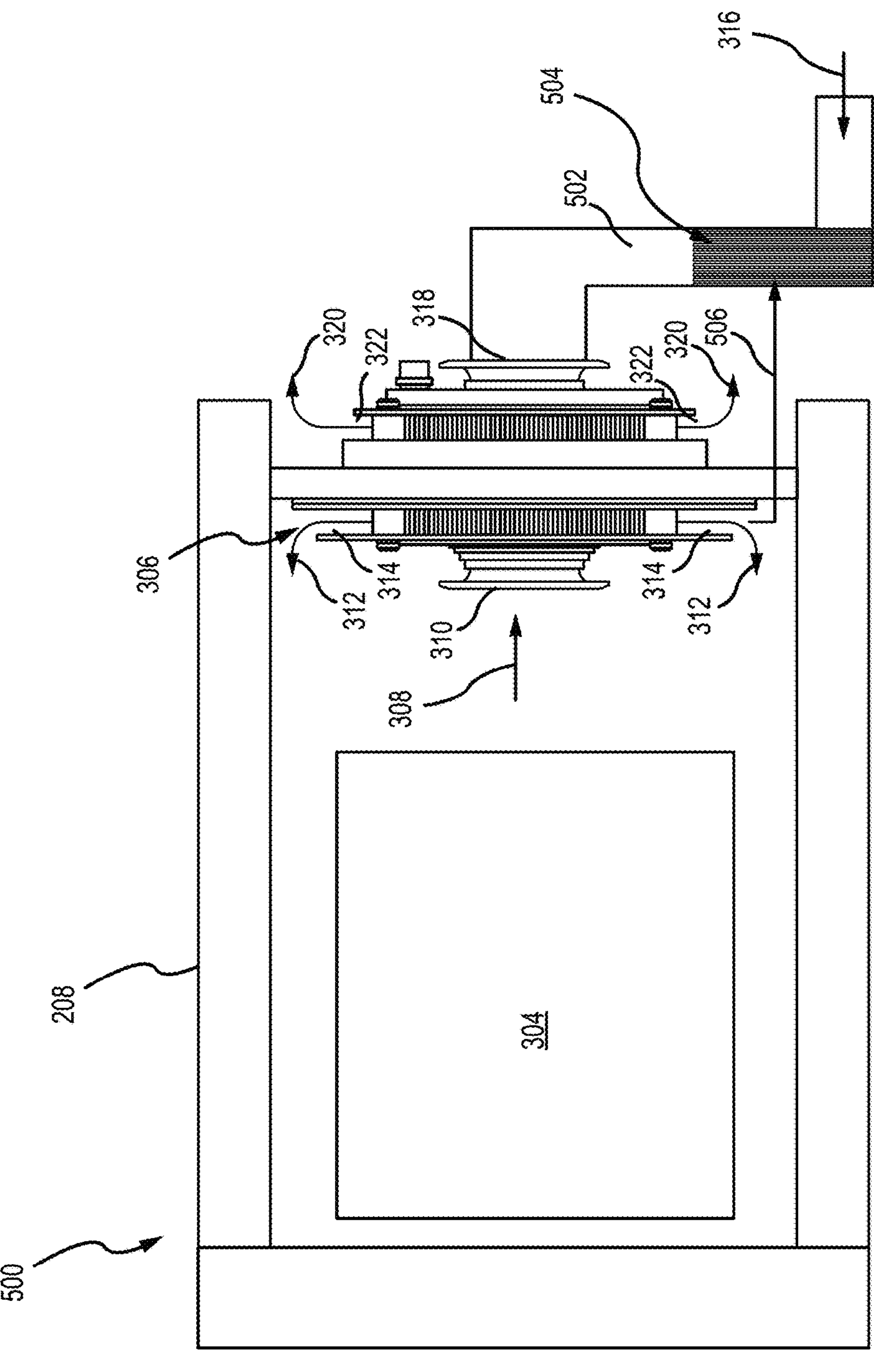
FIG. 5 illustrates a condensed liquid water galley cooling system, in accordance with various embodiments.

Referring now to FIG. 5, a condensed liquid water galley cooling system 500 is illustrated, in accordance with various embodiments. The cooled compartment 302 of the condensed liquid water galley cooling system 500 is similar to that of the cooled compartment illustrated in FIG. 3 in that the cooled compartment 302 may include a space or volume 304 to cool a components, such as a galley cart or a shelved cabinet, among others. In various embodiments, in order to cool the cooled compartment 302, the cooling system 306 is integrated into one of the walls enclosing the space or volume 304. In various embodiments, the cooling system 306 is typically integrated into a rear wall of the cooled compartment 302. In various embodiments, the chilled air 308 from the space or volume 304 flows into the cold-side inlet 310 of the cooling system 306 and the cold air 312 flows out of the cold-air outlets 314 of the cooling system 306. In various embodiments, the ambient air 316 from the cabin area of the aircraft flows into the hot-side inlet 318 of the cooling system 306 and the ambient air 320 flows out of the hot-air outlets 322 of the cooling system 306.

In addition, the condensed liquid water galley cooling system 500 includes an inlet duct 502 that feeds the ambient air 316 to the hot-side inlet 318. In various embodiments, the inlet duct 502 includes a porous inlet heat exchanger element 504. In various embodiments, the porous inlet heat exchanger element 504 may be integrated in-line with the inlet duct 502 coupled to the hot-side inlet 318. In various embodiments, moist air condenses on the cold-side of the cooling system 306, which results in condensed liquid water 506 that needs to be discarded. In various embodiments, the condensed liquid water 506 is delivered to the porous inlet heat exchanger element 504. In various embodiments, the porous inlet heat exchanger element 504 acts as a precooler to evaporate the condensed liquid water 506 and cool the ambient air 316. In that regard, the ambient air 316 passes through the inlet duct 502 and the porous inlet heat exchanger element 504 and evaporates the condensed liquid water 506 delivered to the porous inlet heat exchanger element 504. In various embodiments, the porous inlet heat exchanger element 504 may be coated with a hydrophilic coating to enhance evaporation rates. In various embodiments, the condensed liquid water 506 water may be delivered to the porous inlet heat exchanger element 504 via a delivery system, such as gravity or a pump, among other means so as to soak the porous inlet heat exchanger element 504 of the inlet duct 502 and take advantage of the evaporative cooling resulting in higher cooling capacity and coefficient of performance (COP).

Figure 6:
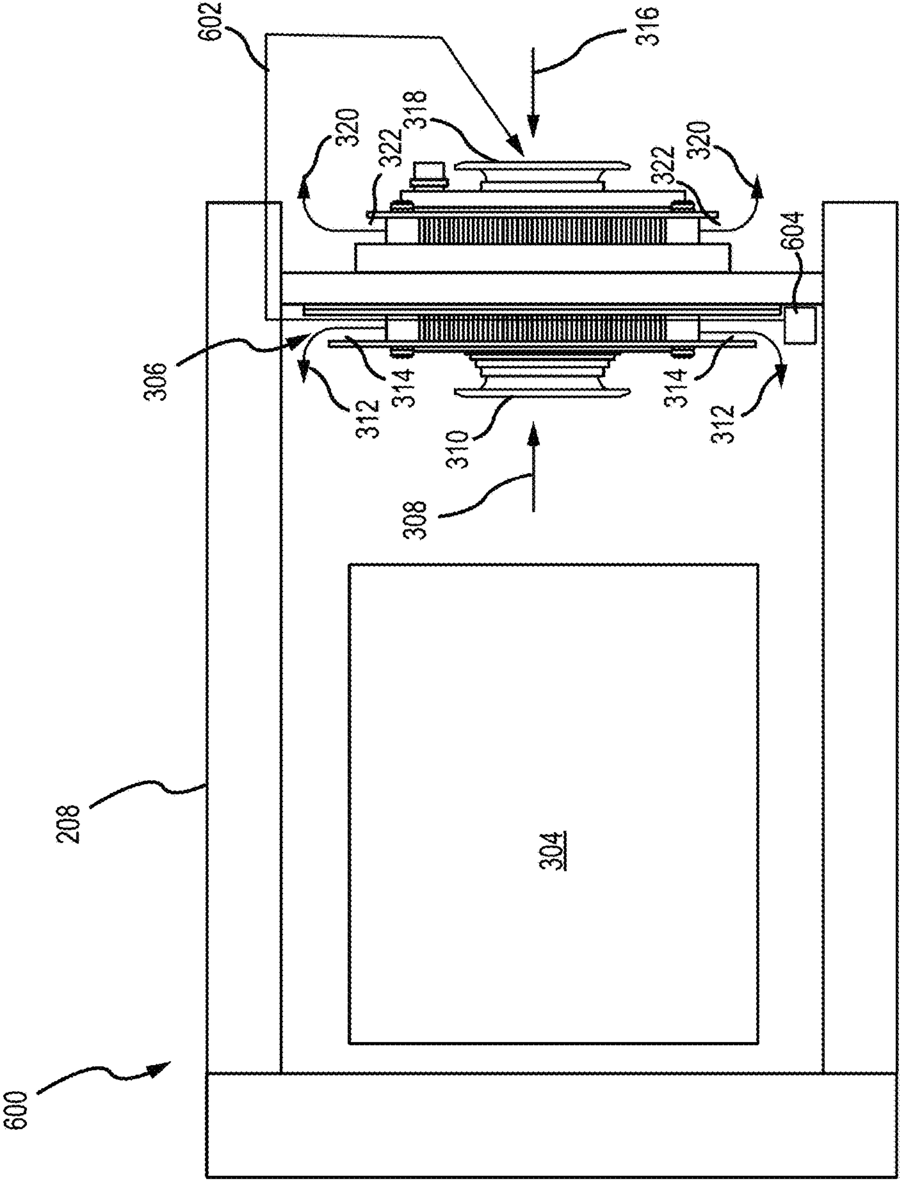
FIG. 6 illustrates a condensed liquid water galley cooling system in accordance with various embodiments.

Referring now to FIG. 6, a condensed liquid water galley cooling system 600 is illustrated, in accordance with various embodiments. The cooled compartment 302 of the condensed liquid water galley cooling system 600 is similar to that of the cooled compartment illustrated in FIG. 3 in that the cooled compartment 302 may include a space or volume 304 to cool a components, such as a galley cart or a shelved cabinet, among others. In various embodiments, in order to cool the cooled compartment 302, the cooling system 306 is integrated into one of the walls enclosing the space or volume 304. In various embodiments, the cooling system 306 is typically integrated into a rear wall of the cooled compartment 302. In various embodiments, the chilled air 308 from the space or volume 304 flows into the cold-side inlet 310 of the cooling system 306 and the cold air 312 flows out of the cold-air outlets 314 of the cooling system 306. In various embodiments, the ambient air 316 from the cabin area of the aircraft flows into the hot-side inlet 318 of the cooling system 306 and the ambient air 320 flows out the hot-air outlets 322 of the cooling system 306.

In addition, in various embodiments, moist air condenses on the cold-side of the cooling system 306, which results in condensed liquid water 602 that needs to be discarded. In various embodiments, the condensed liquid water galley cooling system 600 includes a reservoir and pump system 604 that delivers the condensed liquid water 602 to an inlet fan of the hot-side inlet 318. In various embodiments, the condensed liquid water 602 may be delivered via a delivery system, such as gravity or a pump, and dripped or sprayed, or otherwise delivered to the inlet fan of the hot-side inlet 318 of the cooling system 306 thereby pre-cooling the ambient air resulting in higher cooling capacity and coefficient of performance (COP).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A galley cooler, comprising:

a cooling system, the cooling system comprising:

a hot side, wherein the hot side comprises a hot-side inlet; and a cold side configured to, in response to cooling ambient air entering the cooling system on the hot side via the hot-side inlet, condense moist air into liquid water on the cold side;

a delivery system, wherein the delivery system delivers the condensed liquid water to the hot side of the cooling system to pre-cool the ambient air via evaporative cooling; and an inlet duct, wherein the inlet duct is coupled to the hot-side inlet, wherein the inlet duct comprises an outer lining, wherein the condensed liquid water soaks the outer lining, and wherein the ambient air passing through the inlet duct is pre-cooled by evaporating the condensed liquid water from the outer lining.

2. The galley cooler of claim 1, wherein the outer lining is comprised of an absorbent material.

3. The galley cooler of claim 1, wherein the outer lining is coated with a hydrophilic coating to enhance evaporation rates.

4. An aircraft, comprising:

a galley;

the cooling system of claim 1 configured within the galley.

5. A galley cooler, comprising:

a cooling system, the cooling system comprising:

a hot side, wherein the hot side comprises a hot-side inlet; and a cold side configured to, in response to cooling ambient air entering the cooling system on the hot side via the hot-side inlet, condense moist air into liquid water on the cold side;

a delivery system, wherein the delivery system delivers the condensed liquid water to the hot side of the cooling system to pre-cool the ambient air via evaporative cooling;

an inlet duct, wherein the inlet duct is coupled to the hot-side inlet; and a porous inlet heat exchanger element, wherein the porous inlet heat exchanger element is integrated in-line with the inlet duct coupled to the hot-side inlet, and wherein the ambient air passing through the porous inlet heat exchanger element is pre-cooled by evaporating the condensed liquid water from the porous inlet heat exchanger element.

6. The galley cooler of claim 5, wherein the porous inlet heat exchanger element is coated with a hydrophilic coating to enhance evaporation rates.

7. An aircraft, comprising:

a galley;

the cooling system of claim 5 configured within the galley.

8. A galley cooler, comprising:

a cooling system, the cooling system comprising:

a hot side, wherein the hot side comprises a hot-side inlet; and a cold side configured to, in response to cooling ambient air entering the cooling system on the hot side via the hot-side inlet, condense moist air into liquid water on the cold side; and a delivery system, wherein the delivery system delivers the condensed liquid water to the hot side of the cooling system to pre-cool the ambient air via evaporative cooling, wherein the delivery system delivers the condensed liquid water directly to an inlet fan of the hot-side inlet thereby pre-cooling the ambient air.

9. The galley cooler of claim 8, wherein the condensed liquid water is at least one of sprayed or dripped into the inlet fan.

10. An aircraft, comprising:

a galley;

the cooling system of claim 8 configured within the galley.

* * * * *